Dec. 30, 1952   G. L. BUTLER   2,623,837
METHOD OF MAKING A HOSE COUPLING UNIT
Filed Sept. 17, 1949
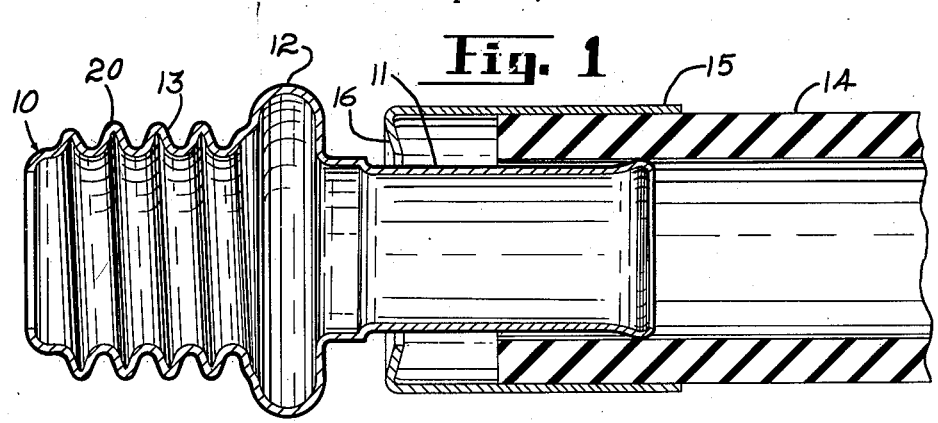
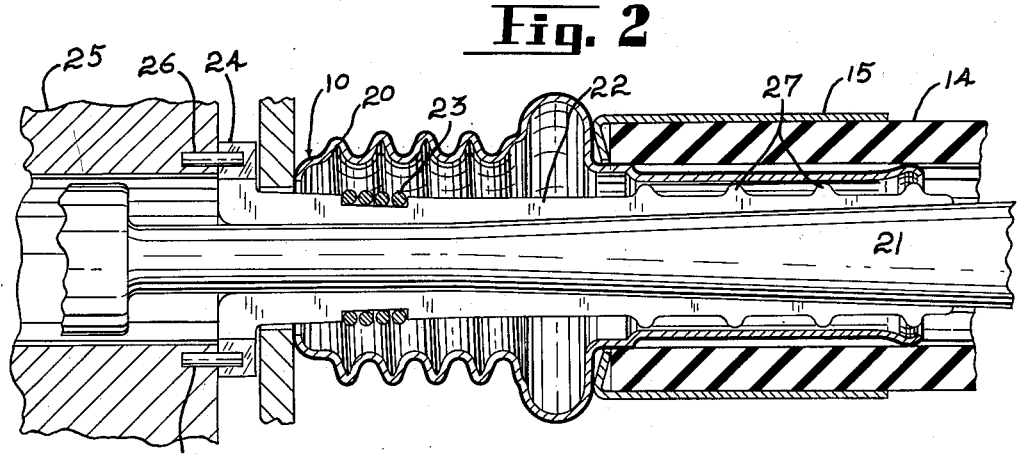
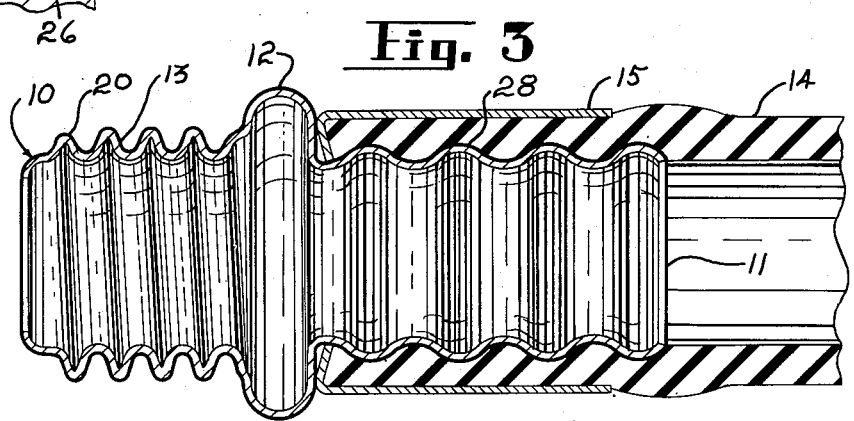
INVENTOR.
Gray L. Butler
BY
H. F. Johnston
ATTORNEY Patented Dec. 30, 1952

2,623,837

UNITED STATES PATENT OFFICE 2,623,837

METHOD OF MAKING A HOSE COUPLING UNIT

Gray L. Butler, Waterbury, Conn., assignor to Scovill Manufacturing Company, Waterbury, Conn., a corporation of Connecticut Application September 17, 1949, Serial No. 116,373

1 Claim. (Cl. 154—83)

This invention relates to a hose coupling unit and to the method of making the same.

In the practice of assembling metal couplings to the ends of flexible tubing made of rubber or plastic, the end of the tubing is usually telescoped over a male nipple of the coupling and an exterior ferrule is provided around the outside of the tubing. The assembly is then completed either by expanding the internal nipple or by contracting the outside ferrule.

The general object of my invention is to provide a simple and inexpensive means of increasing the holding power of the coupling on the tubing. The use of adhesives in general for this purpose would be objectionable due to the expense and difficulty of handling sticky or tacky substances in the assembly process.

According to my invention a substance is applied to one or more of the metal parts of the coupling, and which substance is relatively inert at normal temperatures when the parts are stored, shipped and while being handled in the assembly. I then utilize the fact that during the expansion of the nipple or the contraction of the ferrule, as the case may be, heat is generated which will raise the temperature of the metal. By employing an adhesive coating which will soften and become adherent only with the increase in temperature of the metal during the expansion or contraction an exceedingly firm bond is obtained between the tubing and the metal parts.

With the above and other objects in view the invention consists in the construction, treatment and arrangement of parts as will be described more fully hereinafter.

In the accompanying drawing a conventional form of garden hose coupling is shown merely to illustrate one application of my invention, and wherein—

Fig. 1 is a longitudinal sectional view of a coupling showing it as partially assembled upon the end of a hose.

Fig. 2 is a similar view with the coupling parts fully assembled to the end of the hose in association with a tool for the expansion operation, and Fig. 3 is a sectional view of the coupling in its final state of interlocked assembly.

Referring to the drawing wherein like reference numerals denote like parts, the numeral 10 designates a male member having a nipple portion 11, an intermediate embossed portion 12 and a threaded end 13. The nipple portion 11 is adapted to be inserted into the end of a hose 14 and the threaded end 13 is employed to connect the hose to any complimentary coupling member, not shown.

A ferrule member 15 is also provided with an end flange 16 and which is adapted to be fitted about the end of the hose 14 to a position where the flange 16 will abut the end of the hose. This ferrule member 15 will necessarily have to be fitted over the end of the hose before the nipple portion 11 of the male member 10 is inserted into the end of said hose.

Considering now the real point of my invention, which is to apply an overall coating of material to the male member 10 and which coating is preferably a thermo-plastic material that can be applied either by a spray coating or a dip coating. Where a spray coating is applied it will be for the most part deposited on the outside of the male member 10 such as represented by the heavy line 20 on the outside surface of the male member. A dip coating would obviously be applied to both the outside and inside surfaces of the member 10.

A coating that I found to be very efficient in accomplishing the purposes of this invention is a dewaxed white shellac that will dry upon application and allow the coupling parts to be stored for any length of time at normal temperatures in a dust free state, and which coating will measurably add to preserving the exterior finished surface of the parts.

The final assembly of the coupling to the end of the hose 10 may be effected by an expansion tool of the type shown in Fig. 2. The tool here shown consists essentially of a tapering mandrel 21 around which are clustered a series of segmental jaws 22 held in place on the mandrel as by means of a coil spring 23. The jaws 22 are provided at one end with flanges 24 that are abutted against a boss 25 forming part of the expanding machine (not shown) and kept in uniformly spaced relationship during the expanding operation by pins 26 projecting from the boss 25 and disposed between the adjacent flanges of the sector jaws 22.

The opposite ends of the jaws are formed with radially projecting circumferential ribs 27 that operate to form circumferential ridges or beads 28 in the nipple portion 11 in making the coupling assembly to the hose, such as shown in Fig. 3.

The machine for expanding the coupling is tion but also to expand the body of the nipple portion 11 of the coupling in making the connection but also to expand the body of the nipple portion beyond its original state. During the expanding operation, which is effected by drawing the mandrel axially through the jaws 22 at a relatively rapid rate, considerable heat will naturally be created in the nipple material by the expanding action that will be sufficient to soften up the coating of material 20 so as to cause it to bond to the adjacent inner surface of rubber hose, and when the nipple portion cools off, the softened coating will dry and harden thus increasing the gripping effect between the male member and the hose. Tests that have been conducted on coupling connections made according to this method and principle have proven that the gripping effect between the coupling parts and hose material is increased from 30% to 50% depending on the type of the hose material and type of coupling used.

While the coating 20 is shown in the drawings as being applied only to the male part, it is also within the purview of this invention to apply a similar coating to the inside surface of the ferrule member 15, as there are numerous types of couplings wherein the ferrule is compressed radially inwardly in making a connection to a hose end.

It will be understood that the above description and accompanying drawing comprehend only the general and preferred embodiment of the invention, and that various types of coupling units, coating materials used and methods of assembly may be resorted to within the scope of the appended claim and without sacrificing any of the advantages of the invention.

I claim:

The process of bonding flexible hose to the nipple part of hose couplings comprising applying a coating of thermo-plastic material in liquid form to the outside surface of said nipple part and allowing said material to dry, inserting said nipple part into the end of a flexible hose and expanding said nipple at a rate to raise the temperature of said nipple sufficiently to soften the coating material and cause it to adhere to the rubber hose.

GRAY L. BUTLER.

REFERENCES CITED

The following references are of record in the file of this patent:

UNITED STATES PATENTS

| Number | Name | Date |
|---|---|---|
| 1,461,130 | Loughead | July 10, 1923 |
| 1,756,698 | Oden | Apr. 29, 1930 |
| 1,911,775 | Smith | May 30, 1933 |
| 2,146,756 | Miller | Feb. 14, 1939 |
| 2,320,367 | Leathers | June 1, 1943 |